Feb. 19, 1946. M. A. VON BABO 2,395,087
CARD PLAYING INSTRUCTION DEVICE
Filed Feb. 25, 1944 2 Sheets-Sheet 1

INVENTOR
Max A. Von Babo
BY Arnold and Mathis
ATTORNEYS

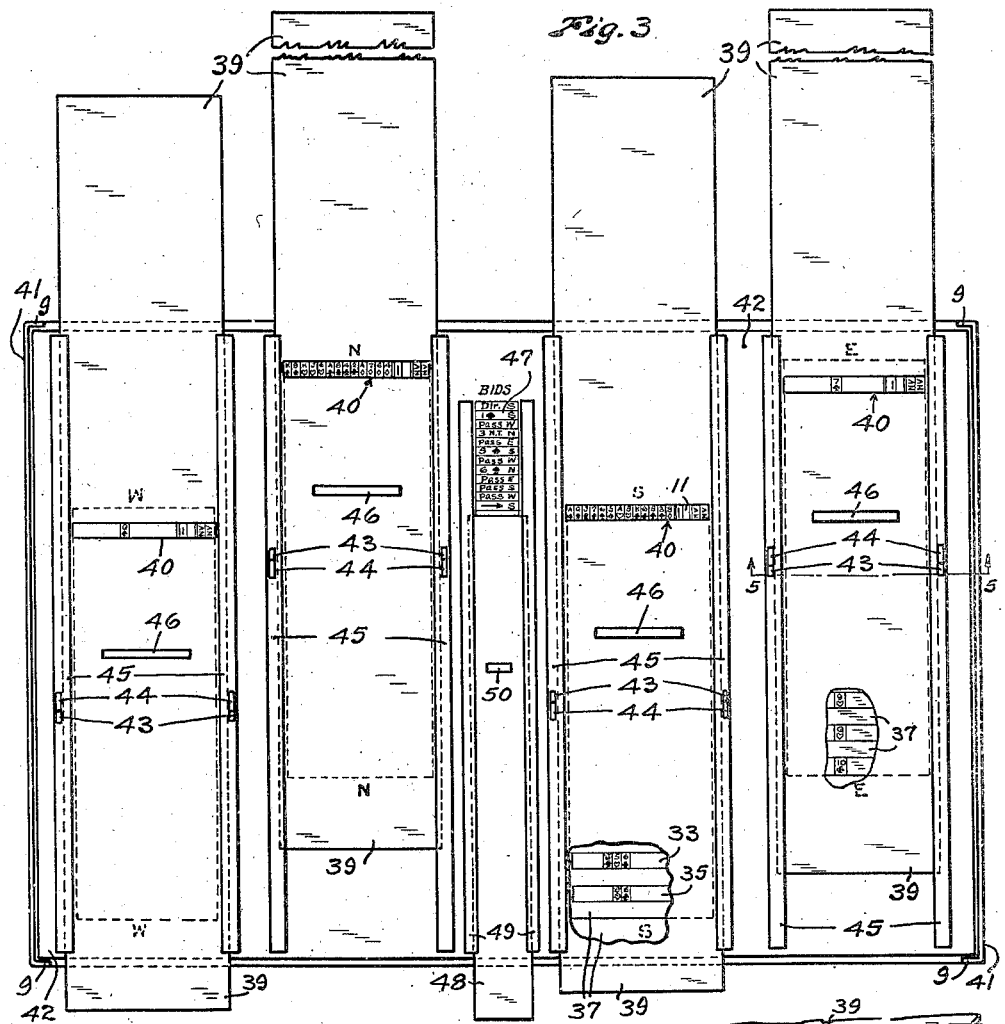
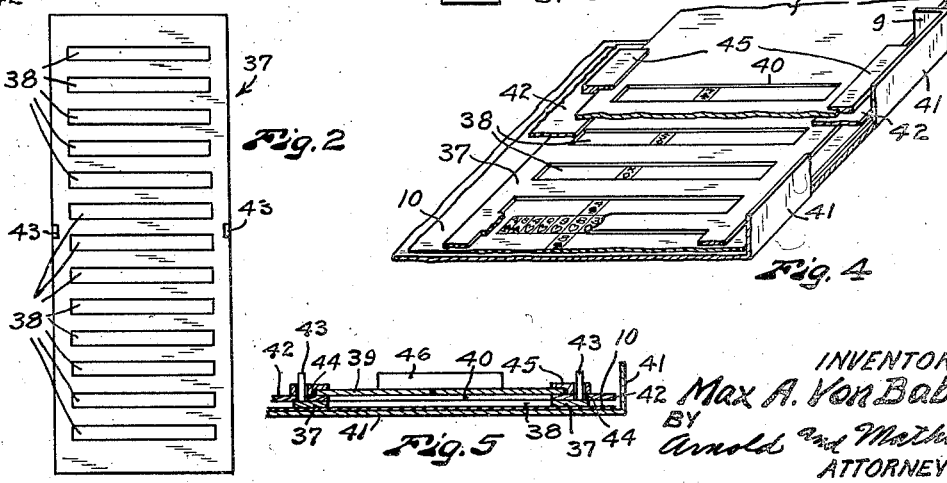

Patented Feb. 19, 1946

2,395,087

UNITED STATES PATENT OFFICE 2,395,087

CARD PLAYING INSTRUCTION DEVICE

Max A. Von Babo, Seattle, Wash.

Application February 25, 1944, Serial No. 523,853

8 Claims. (Cl. 35—8)

My invention relates to a bridge playing instruction device for use by one to four persons.

More particularly, my invention relates to a device which will permit from one to four persons to play representations of the cards of a preselected deal and to check after the mental selection of a card indicium as to whether or not the play so selected by an individual player checks with that preselected by the expert preparing the particular deal in question.

It is a particular object of my invention to provide a chart member bearing indicia thereon to indicate a plurality of playing hands, as four, each of which displays representations of the cards in a hand during the various rounds of play and also displays individually representations of the cards played during the rounds of play. The representations are hereinafter referred to as "cards." It is a further object of the invention to provide ladder-like masking means so that the cards present in any one hand during the various rounds of play may be all masked, or the cards played during the various rounds of play may be all masked depending upon the relative position of the masking means and the chart bearing the card indicia.

It is a further object of my invention to provide other masking means so that if the ladder-like masking means permits the exposure of the cards in a hand during the various rounds of play then said second masking means may be moved to expose consecutively and individually the cards in a hand during each round of play. It is a further object of the invention to provide second masking means so that if the individual cards played during the respective rounds of play are exposed by the ladder-like masking means, then the second masking means may be moved to permit exposure consecutively and individually of a card played during an individual round of play.

It is a further object of the invention to provide means whereby either, but not both, the cards played during the rounds of play or the cards remaining in a hand during the rounds of play may be selectively and consecutively exposed so that any hand may contain the ultimate declarer's hand, either of the ultimate defenders' hands, or the dummy hand. This permits educational use of the apparatus so that a hand prepared to illustrate bidding may bear any relation to the ultimate contract reached as best illustrates the educational point or principle involved in a preselected hand. This is to be distinguished from many bridge playing devices now on the market where the construction thereof limits the possibility so that the station or hand indicated, as S, is normally the declarer. Obviously, if a player knows that he has been given a hand which will be ultimately the declarer he is prewarned to keep the bidding open until some contract is reached. Obviously, in playing the bridge hand any tip or warning as to who is the final declarer spoils the bidding routine and in turn spoils the playing routine as both bidding and playing must essentially be performed from the observation of only one hand plus such other legitimate information as the bids that have been made and seeing the dummy after the first card has been played.

It is a primary object of my invention to provide a mechanical bridge-playing device wherein the player obtains the same information that he obtains in the playing of an actual bridge game and the player can, after each play or after each bid, check his selection with that of the expert preparing the particular deal involved—all without giving the player any more information than he would obtain during the playing of a bridge hand and thus a truly educational device obtains.

It is a further object of my invention to provide a device so that if a hand of a preselected deal is chosen to illustrate a principle either in offensive or defensive bidding or in offensive or defensive playing, that a player can make his bid and conduct his play of the cards on the same information which he would get during the bidding or playing of an ordinary bridge hand and then he can immediately check his bid or play with that indicated as correct by the bridge expert preparing the hand.

It is a further object of my invention to provide a device so that one player may play the cards from the same hand or location, such as S position, and the cards may be located in the various hands so that the cards of an offensive player or a defensive player may be selected by the expert for the arbitrarily selected hand and the mechanical devices will permit play of all hands.

It is a further object of the invention to provide a device so that a player may select to play from any hand or location he desires and the mechanical devices will permit play of all hands.

The above mentioned general objects of my invention, together with others inherent in the same, are attained by the mechanism illustrated in the following drawings, the same being a preferred exemplary form of embodiment of my invention, throughout which drawings like reference numerals indicate like parts:

Fig. 2 is a plan view of a ladder-like masking means, one of which is disposed over and mounted for relative movement as respects each of the four playing hand sections shown on the chart of Fig. 1;

Fig. 3 is a plan view of the completed apparatus with portions broken away and portions removed and with a ladder-like means of Fig. 2 in different relative positions as respects the four playing hand sections to better illustrate the invention;

Fig. 4 is a fragmentary view in perspective and with portions broken away to illustrate the mode of operation of the completed device; and Fig. 5 is a fragmentary view in section taken substantially on broken line 5—5 of Fig. 3.

Figure 1:
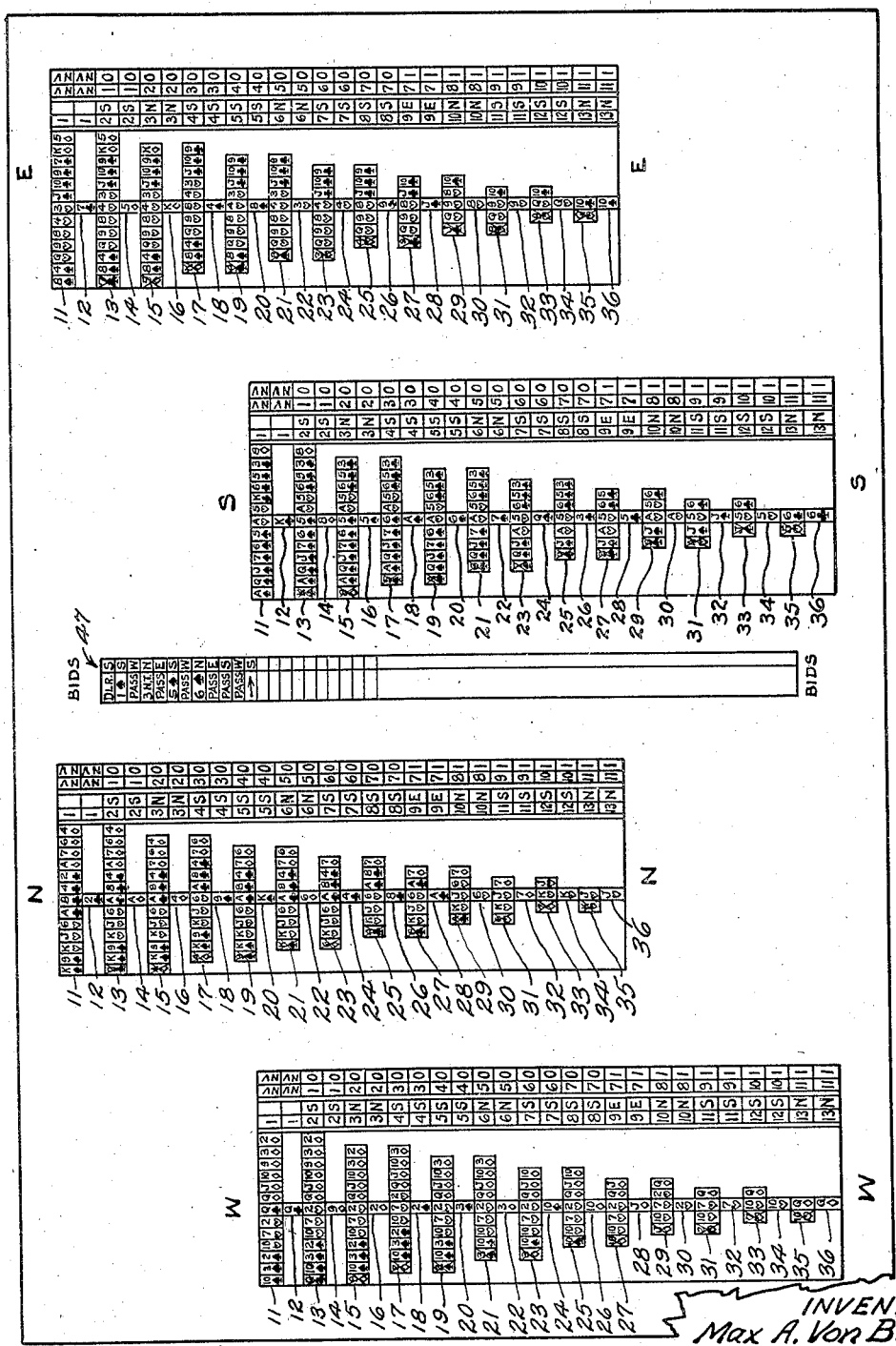
Figure 1 is a fragmentary view of a chart bearing card indicia of a selected deal which may be played by use of my apparatus.

Referring to the chart 10 (shown separately in Fig. 1 of the drawings), a prearranged bridge deal of an ordinary deck of fifty-two cards and for four players is illustrated. However, it is to be understood that this invention is not limited to the ordinary deck of fifty-two cards nor to four playing hands. The players are represented respectively by the common terminology E, S, N, and W. By way of illustration of a preselected deal, each hand or playing hand section displays the cards which, in accordance with the expert, should be in or remain in the hand of S during the rounds of play in consecutive and spaced apart rows given odd numbers starting with 11 and ending with 35, such as rows one below the other on the chart 10. Also, the individual cards that are supposed to be played during the various rounds of play of the cards are displayed in consecutive and spaced second rows, numbered with even numbers starting with 12 and ending with 36. Thus, by way of illustration the cards dealt to the player S will be in row 11 of S. The cards remaining in the hand S during the second round of play will be displayed in the row 13 of S, the cards remaining in the hand S during the third round of play will be displayed in the row 15 of S, and so forth. The card to be played by S on the first round of play is found in row 12 of S and is the king of clubs. The card to be played by S during the second round of play will be found in row 14 and is the 8 of diamonds. From the foregoing the cards remaining in a hand during any round of play and the card to be played during any round of play in the hand S will be apparent. Also, the construction is identical as to the other players E, N, and W and, in the interest of brevity, is not detailed. Also, in the row 13, which will be the cards remaining in a hand after the first round of play, the card played during the first round of play is repeated, and suitable indication means as an "X" appears over such card. For example, in row 13 of S an "X" appears over the king of clubs to indicate that such card should have been played during the first round of play.

Referring to Fig. 2, a ladder-like masking means 37 is illustrated. This may be in the form of a rectangular flat member as a cardboard sheet providing thirteen openings 38 each of a size to register with any one of the rows 11 to 36 inclusive of a player as shown in Fig. 1. The sight openings 38 of the ladder-like masking means 37 are separated by bar-like masking members which are of a size to mask alternate rows of the rows 11 to 36 inclusive and to provide registration of the rows disposed between said alternate rows with the openings 38. The ladder-like masking means 37 is disposed on and mounted for relative movement as respects a playing hand section as the section S so that when the ladder-like masking means 37 is in one position the odd numbered rows starting with 11 and ending with 35 will be visible through the sight openings 38, and when the ladder-like masking means 37 is in its second position the even numbered rows starting with 12 and ending with 36 will be in registration with the sight openings 38. Thus, by relative movement between the ladder means 37 and a playing hand section, such as S, I provide visible consecutive rows as the odd numbered rows starting with 11 and ending with 35, so there is indicated consecutively the cards remaining in a hand during the respective rounds of play of the cards, and I further provide, when the ladder-like means 37 is in its other position, consecutive visible rows, having numbers starting with 12 and ending with 36, indicating consecutively the cards played during the rounds of play.

Referring to Fig. 3, second masking means 39 are provided each having a single sight opening 40 and a masking means 39 is disposed over each ladder-like masking means 37 and the playing hand section, as S, disposed below said ladder-like masking means 37. The masking means 39 having the single sight opening 40 is mounted for movement as respects the ladder-like masking means 37 and a playing hand section, as S, so that the opening 40 may be registered with any of the rows 11 to 36 inclusive, and, depending upon the position of the masking member 39 and the ladder-like masking means 37, only one of the rows of 11 to 36 inclusive will be visible through the sight opening 40.

In Fig. 3 by way of example, the ladder-like masking means 37 of the player W has been moved so that the individual cards played during any round of play are in registration with the sight openings 38 of the ladder-like masking means 37. Also, the masking means 39 has been moved so that the sight opening 40 thereof is in registration with the card played during the first round of play, i. e., row 12 of W showing the queen of clubs. For purposes of illustration, the masking member 39 of the player N has been moved so that the cards remaining in the hand after each play are in registration with the openings 38 of the ladder-like masking means 37 and also the masking member 39 has been moved so that the sight opening 40 thereof is in registration with the cards dealt to the player N or row 11 of N. So far as the player S is concerned, as illustrated in Fig. 3, the ladder-like masking means 37 of said player is in the position where the cards remaining in a hand, i. e., the odd numbered rows starting with 11 and ending with 35, are uncovered by the ladder-like masking means 37 and the member 39 of the player S has been adjusted so that the sight opening 40 registers with the cards dealt the player S or in other words the row 11 of S. Also, a fragment of the masking member 39 over the playing hand section of the player S has been broken away so that the rows 33 and 35 of the playing hand section of the player S are visible through the sight openings 38 of the ladder-like masking member 37. Also, in said Fig. 3 and as respects the player E the ladder-like masking means 37 has been moved to the position so that the individual cards played during the rounds of play or the even numbered rows will be visible through the sight openings 38 of the ladder-like masking means 37. Also, the masking member 39 of the player E has been adjusted so that through the sight opening 40 the card played on the first round of play (row 12 of E) is visible therethrough, which, in the present example, is the seven of clubs. Furthermore, a portion of the masking member 39 of the player E has been broken away so that the cards to be played by E during the last three rounds of play (i. e., rows 32, 34 and 36 of E) are in registration with sight openings 38 of the ladder-like masking means 37 of the player E—in other words the nine of hearts, the queen of hearts, and the ten of clubs are indicated in consecutive rows.

As a means for providing relative movement between ladder-like masking means 37 and a chart 10, a box-like member 41, Figs. 3, 4, and 5, receives and holds chart 10. The upright side portions of the box 41 prevent movement of the chart in one direction and the corner portions 9 prevent movement in the other direction. The size of the chart 10 is such as to register with the size of the bottom of the box 41 and said chart 10 is therefore relatively immovably mounted in said box 41. A frame means 42 is of a size similar to that of chart 10 and the frame means 42 is provided with openings registering with the various indicia on chart 10 to expose all indicia on said chart 10. The frame means 42 is provided as a means to suitably support the various ladder-like masking means for the four playing sections and also as a mounting means for the various masking means 39 (and another masking means 48 to be hereinafter described).

The lengths of the four ladder-like masking means 37 are such that the ladder-like masking means over each playing hand section may be moved to provide the masking action hereinbefore described. In order to provide readily engageable means and stop means for each ladder means 37 openings 44 are disposed in frame means 42 and projecting engageable tabs 43 are carried on each side of each ladder 37 and the same project through said openings 44 so the same may be engaged and each ladder 37 adjusted externally to either one of its before mentioned positions. When tabs 43 are moved upwardly, as respects the showing in Fig. 3, until they are stopped by openings 44, the openings 38 of the ladder-like masking means 37 will be in registration with the cards remaining in a hand during the various rounds of play. When the tabs 43 are moved in the other direction until stopped by the openings 44, the openings 38 of the means 37 will be in registration with the individual cards played in a hand during the various rounds of play. As a means for slidably mounting a masking member 39 over each playing hand section I have shown four pairs of members 45 which are secured to the top side of the frame member 42 and provide for spaced apart grooves in which a masking member 39 for each playing hand section E, S, N and W may be slidably mounted. As means to provide for ready engagement with a masking member 39 I provide an upwardly projecting tab 46 on each member 39. Also in each member 39 a sight opening 40 is shown so that only one of the rows 11 to 36 inclusive may be visibly indicated.

A row indicated by "Bids" in Fig. 1 and indicated by "Bids" and the numeral 47 in Fig. 3 is provided on which are indicated in successive rows the dealer, the various bids made by various players during the bidding, and the ultimate contract holder. Thus, for the selected hand shown on chart 10 the player S is the dealer and his first bid is one in spades. The player W passes, the player N bids three no trump, and the player E passes. The bidding continues until it is ascertained that the player S has obtained the contract of six in spades. Mounted on the member 42 is a slidably mounted masking member 48 and this may be accomplished by providing members 49, which will be similar in operation to the members 45, mounting the masking member 39. The slide or the masking member 48, which is slidably mounted on frame means 42 by the members 49, has a readily engageable tab 50 so that the mask 48 may be moved to individually and consecutively expose the various bids during the rounds of bidding.

In operation of the device herein described as illustrating my invention, a chart 10 containing preselected hands will be deposited in the box 41 and the member 42 carrying on its lower side the ladder-like masking means 37 and on its upper side the various masking means 39 and 48 will be disposed on said chart 10. Before depositing the same on the chart 10 the masking member 48 will be moved upwardly, as respects the showing in Fig. 3, so that it will be masking all bids. Also, the four masking members 39 will be moved upwardly so that the sight opening 40 thereof is above the rows 11 or the cards dealt to the various players. In disposing the cards in the various playing hand sections, E, S, N, and W, one hand such as S may be arbitrarily selected as the hand which should be bid and played in the event of a single player so as to best illustrate a principle involved in a preselected hand. Then such single player will move the masking member 48 downwardly until the notation Dlr. S appears and he will then know that the dealer's hand has been selected for the player S so that he will then move the ladder-like masking member 37 of the hand S upwardly so that the openings 38 will register with the cards in the hand S during the various rounds of play. The length of the opening 44 in the member 42 is such that when the member 43 is in its uppermost position the openings 38 of the ladder-like masking means 37 will register with the odd numbered rows and when the member 43 is in its lowermost position, as controlled by the size of the opening 44, the openings 38 will be in registration with the even numbered rows 12, 14, etc. Thus, by moving the members 43 upwardly and thereafter moving the masking member 39 downwardly until the sight opening 40 registers with the first row of exposed material, or the row 11, the player S will be able to ascertain the cards dealt him. Knowing that he is the dealer and therefore the first bidder in accordance with present standard rules of bridge, the player S will mentally make his first bid and thereafter move the slide 48 downwardly until the second notation indicating that player S should bid one spade appears. This he can check with the bid he has made for accuracy of his bid. Then the player S will move the member 48 downwardly to indicate consecutively that W has passed, that N has bid three no trump, and that E has passed. Thereupon S will make the bid which he deems is correct and then check his bid with that of the expert and he finds he should or did bid five spades. At this stage it is important to recall that the player S is not necessarily the declarer, and the hand which may have been deposited at S may either be a defensive hand, a dummy hand, or a declarer's hand. Thus S has no more preknowledge of the situation than he would have in playing ordinary bridge and he bids on his cards and not on any information such as knowing that he will be the declarer. After he has made his bid and checks to determine that his bid is or should have been five in spades he will ascertain consecutively that W has passed, that N has bid six spades, and that E has passed. Thereupon he will select his proper bid and check the same and finds that his bid is or should have been a passing bid. After uncovering the next bid which is that W has passed, the bidding is closed in accordance with the rule regarding three consecutive pass bids and therefore S finds himself as the declarer of a contract of six spades. Thereupon the slide 48 is preferably returned to masking position covering all of the bids and the player S must remember the bids which have been made by the various parties so that he will be playing under conditions existing in normal play of cards.

In order that the other hands will be exposed in accordance with their playing relations to the hand S, the player S then adjusts the mechanisms for the other players. As to station N the ladder-like masking means is moved up, i. e., the projections 43 are moved upwardly in the openings 44 to an upper position so that the openings 38 in the masking means 37 will be in registration with the cards remaining in the hand of N during the various rounds of play. The ladder means 37 of the players E and W will be moved downwardly so that the openings 38 of the masking means 37 of each of the players E and W will be in registration with the individual cards played by said E and W during the various rounds of play. Thus, for example, on the first round of play W will play the queen of clubs and such card and the corresponding rows for subsequent play will be in registration with the openings 38 of the ladder means 37 of W. The ladder means 37 of E will be similarly adjusted to that of W. In view of the rule that the party to the left of the bidder has the right to make the first play, the player will move the slide 39 of W downwardly until the first card played by W or the queen of clubs is exposed. Next, the player S will move the slide 39 of the player N downwardly to expose the cards in the dummy and will find that the dummy includes the cards the king of spades, the nine of spades, the king of hearts, etc., as shown in the playing hand section N of the chart 10 of Fig. 1. Then the player S will select a card to be played from the dummy or player N and will move the slide 39 downwardly to check the play which should have been made. In view of the position of the ladder 37 of the player N the row showing the two of clubs will be masked and the row showing all of the cards in the hand of the player N with the two of clubs suitably marked out as the card played such as by an "X" will appear and the player can check whether he has made the proper play from the dummy hand. Then the player will move the masking means 39 of the player E downwardly and will ascertain that the player E has played the seven of clubs on the first trick. Then the player will select his play from the hand S and move the masking member 39 downwardly and he will find in accordance with row 13 that he has or should have played the king of clubs on the first round of play. The other information which will be indicated through the various sight openings of the various players is that they are playing the first round which is indicated by the number 1 and that both sides are indicated by NV as being not vulnerable. Below the indications of not vulnerable, the number of tricks taken by the respective sides may be indicated. Thus, in row 13 which will be the cards in the hand S after the first round of play and during the second round of play, there will be indicated that the second round is being played, that S took the last trick, and that N and S have taken one trick and that E and W have taken no tricks. A disadvantage of showing in each hand the tricks taken is that a player in checking a selected play may see who is to take a trick and may thus reconsider a play. However, this disadvantage can be overcome by printing the information relative tricks taken only opposite the fourth player in each round of play. However, as this feature is not a claimed portion of the invention, it is not further illustrated.

As S has taken the first trick and sees the cards in his hand and those in the dummy hand, as in accordance with the information present during playing of normal bridge, he selects the card to be played on the second round and in order to check his selection he moves the slide 39 over the hand S downwardly until the row 15 appears and he finds that the eight of diamonds has been indicated by an "X" as the card which he did or should have played on the second round. He moves the slide 39 of W down and finds that on the second trick W played the nine of diamonds. He then selects the card to be played by the dummy hand on the second round and moves the slide of N downwardly and determines that the ace of diamonds is the proper card to be played on the second round by the dummy hand. From the foregoing it is believed obvious the sequence of operation to determine the play an opponent has made and to select and determine the accuracy of the play to be played by both the player and the dummy and that further statement regarding the same is not here necessary.

In the event that a defender's hand (to be located on either side of a declarer) has been selected for the player S to bid and play, then the player S will adjust the ladder-like means of the player N, E, or W, which is to be the dummy hand, so that the corresponding odd numbered rows of such hand will be in registration with the openings 38 of the ladder member 37 of the hand involved so that the full hand of the dummy as it appears during the various rounds of play will be visible upon proper adjustment of the slide 39. As to the other two hands the ladder-like members 37 will be moved downwardly so that upon manipulation of the members 39 of said two other hands all that will appear is the card that has been played during a round of play and that all of the cards in such hands will not be visible.

Also, it will be apparent that it is possible to permit a player to bid at S station, the ultimate dummy hand, and then to play at N station, the declarer's hand. The manipulation of the apparatus for such purposes is believed apparent. Also, if a player desires to play any hand (i. e., other than a predetermined one as S) he may do so and the mechanical means obviously can be manipulated for the playing. Also, if desired, all hands may be opened to show cards in the hands for study and education. Often a player may wish to visualize all hands at any stage of the play to best understand a particular play, as a "squeeze play" or other play.

I have provided all stations N, E, S and W with similar structures so that greatest use of the apparatus may be had. Obviously, if a fixed position for a player as S is employed, or a fixed dummy as N, or other such limitations, then the structures at the various stations N, E, S and W would not need to be the same and some parts could be obviously eliminated.

Obviously, changes may be made in the form, dimensions, and arrangement of the parts of my invention, without departing from the principle thereof, the above setting forth only a preferred form of embodiment.

I claim:

1. A game educational apparatus comprising a chart member bearing indicia constituting a plurality of playing hand sections, each section displaying the cards in a hand during the rounds of play of the cards in consecutive and spaced apart rows and individually displaying the cards played during the rounds of play of the cards in consecutive and spaced apart other rows disposed in the spaces between the first mentioned rows; ladder-like masking means, comprising a plurality of spaced masking bar members having a sight opening between adjacent bar members, disposed on and mounted for relative movement as respects said chart member and when in a first position registering the sight openings thereof with the first mentioned rows and when in a second position registering the sight openings thereof with the said other rows; and a movably mounted second masking means having a sight opening therein and disposed on said ladder-like masking means permitting registration of said sight opening thereof with a sight opening of said ladder-like masking means, whereby the ladder-like masking means may be moved to a first position and the cards in a hand during rounds of play may be consecutively displayed through the sight opening of the second masking means and the ladder-like masking means may be moved to a second position and the cards played during rounds of play of the cards may be consecutively and individually displayed through the sight opening of the second masking means.

2. A game educational apparatus comprising a chart member bearing indicia constituting a plurality of playing hand sections, each section displaying the cards in a hand during each round of play of the cards and also indicating, as such, the card played during the previous round in consecutive and spaced apart rows, and individually displaying the cards played during the rounds of play of the cards in consecutive and spaced apart other rows disposed in the spaces between the first mentioned rows; ladder-like masking means, comprising a plurality of spaced masking bar members having a sight opening between adjacent bar members, disposed on and mounted for relative movement as respects said chart member and when in a first position registering the sight openings thereof with the first mentioned rows and when in a second position registering the sight openings thereof with the said other rows; and a movably mounted second masking means having a sight opening therein and disposed on said ladder-like masking means permitting registration of said sight opening thereof with a sight opening of said ladder-like masking means, whereby the ladder-like masking means may be moved to a first position and the cards in a hand during rounds of play may be consecutively displayed through the sight opening of the second masking means and the ladder-like masking means may be moved to a second position and the cards played during rounds of play of the cards may be consecutively and individually displayed through the sight opening of the second masking means.

3. A game educational apparatus comprising a chart member bearing indicia constituting a plurality of playing hand sections, wherein a section displays the cards in a hand during the rounds of play of the cards in consecutive and spaced apart rows and individually displays the cards played during the rounds of play of the cards in consecutive and spaced apart other rows disposed in the spaces between the first mentioned rows; movably mounted ladder-like masking means, comprising a plurality of spaced masking bar members having a sight opening between adjacent bar members, disposed on and mounted for relative movement as respects said chart member and when in a first position registering the sight openings thereof with the first mentioned rows and when in a second position registering the sight openings thereof with the said other rows; and a movably mounted second masking means having a sight opening therein and disposed on said ladder-like masking means permitting registration of said sight opening thereof with a sight opening of said ladder-like masking means, whereby the ladder-like masking means may be moved to a first position and the cards in said hand during rounds of play may be consecutively displayed through the sight opening of the second masking means and the ladder-like masking means may be moved to a second position and the cards played during rounds of play of the cards may be consecutively and individually displayed through the sight opening of the second masking means.

4. A game educational apparatus comprising a chart member bearing indicia constituting a plurality of playing hand sections, each section displaying the cards in a hand during the rounds of play of the cards in consecutive and spaced apart rows and individually displaying the cards played during the rounds of play of the cards in consecutive and spaced apart other rows disposed in the spaces between the first mentioned rows; movably mounted ladder-like masking means, comprising a plurality of spaced masking bar members having a sight opening between adjacent bar members, disposed on and mounted for relative movement as respects said chart member and when in a first position registering the sight openings thereof with the first mentioned rows and when in a second position registering the sight openings thereof with the said other rows; projecting engaging means carried by oppositely disposed marginal portions of said ladder-like masking means; and a movably mounted second masking means having a sight opening therein and disposed on said ladder-like masking means and between said projecting engaging means and permitting registration of said sight opening thereof with a sight opening of said ladder-like masking means, whereby the ladder-like masking means may be moved to a first position and the cards in a hand during rounds of play may be consecutively displayed through the sight opening of the second masking means and the ladder-like masking means may be moved to a second position and the cards played during rounds of play of the cards may be consecutively and individually displayed through the sight opening of the second masking means.

5. A game educational apparatus comprising a chart member bearing indicia constituting a plurality of playing hand sections, each section displaying the cards in a hand during the rounds of play of the cards and also indicating, as such, the card played during the previous round in consecutive rows; and a masking means having a sight opening therein disposed over and mounted for relative movement as respects said chart permitting registration of said sight opening thereof with one of said rows, whereby upon said movement of said masking means the cards in a hand during rounds of play and the card played during the previous round may be consecutively displayed through the sight opening of the masking means.

6. A game educational apparatus comprising a chart member bearing indicia constituting a plurality of playing hand sections, each section displaying the cards in a hand during the rounds of play of the cards in consecutive and spaced apart rows and individually displaying the cards played during the rounds of play of the cards in consecutive and spaced apart other rows; and masking means relatively movably mounted as respects said chart and with sight opening means registerable with the cards in a hand during a round of play and with the card played during the preceding round of play.

7. A game educational apparatus comprising a chart member bearing indicia constituting a plurality of playing hand sections, each section displaying in consecutive spaced apart rows the cards in a hand during the rounds of play of the cards and the cards played during the preceding rounds of play; and masking means relatively movably mounted as respects said chart and provided with sight opening means registerable with each of said rows.

8. A game educational apparatus comprising a chart member bearing indicia constituting a plurality of playing hand sections, each section displaying the cards in a hand during the rounds of play of the cards in consecutive and spaced apart rows and individually displaying the cards played during the rounds of play of the cards in consecutive and spaced apart other rows; cover means disposed on and relatively immovable as respects said chart and having sight openings registering with said sections; and masking means relatively movably mounted as respects said opening in said cover means, said masking means being provided with sight opening means registerable with the cards in a hand during a round of play and with the card played in the preceding round of play.

MAX A. VON BABO.